United States Patent [19]
Buckwalter

[11] 3,834,618
[45] Sept. 10, 1974

[54] TEMPERATURE SETBACK CONTROL
[75] Inventor: Leonard Buckwalter, Weston, Conn.
[73] Assignee: Louis H. Keens, Milton, Conn.; a part interest
[22] Filed: Feb. 11, 1974
[21] Appl. No.: 441,419

Related U.S. Application Data
[63] Continuation-in-part of Ser. No. 385,857, Aug. 6, 1973, abandoned.

[52] U.S. Cl.............. 236/46, 219/511, 337/304, 337/377
[51] Int. Cl. .......................................... H01h 37/14
[58] Field of Search............ 236/68 B, 46; 219/511; 337/377, 304; 62/202

[56] References Cited
UNITED STATES PATENTS

| | | | |
|---|---|---|---|
| 1,207,618 | 4/1916 | Otis..................................... | 236/46 |
| 1,757,951 | 5/1930 | Breese, Jr. ............................ | 236/46 |
| 1,876,636 | 9/1932 | Dicke................................... | 236/46 |
| 1,931,464 | 10/1933 | Dicke................................... | 236/46 |
| 2,719,672 | 10/1955 | Jenkins................................ | 236/46 |
| 3,051,815 | 8/1962 | Hukee et al.......................... | 236/68 B X |
| 3,251,549 | 5/1966 | Hewitt, Jr. et al. ................. | 236/68 B |
| 3,386,496 | 6/1968 | O'Connor............................. | 236/68 B X |
| 3,525,222 | 8/1970 | Schuller............................... | 62/202 |
| 3,726,105 | 4/1973 | Auracher.............................. | 62/202 |

*Primary Examiner*—William E. Wayner
*Attorney, Agent, or Firm*—St. Onge Mayers & Reens

[57] ABSTRACT

A temperature setback control is described which may be conveniently utilized with existing heating systems by mounting the control within an air-flow influencing distance from a conventional thermostat which controls the heating system. The control produces a convection flow of heated air during a setback time period to obtain a temperature setback level in the room heating zone or building in which the thermostat is located. A temperature sensor regulates the operation of the control to maintain the room at the setback temperature level. A housing to enable the influencing of the thermostat with the convection flow of heated air is described.

17 Claims, 12 Drawing Figures

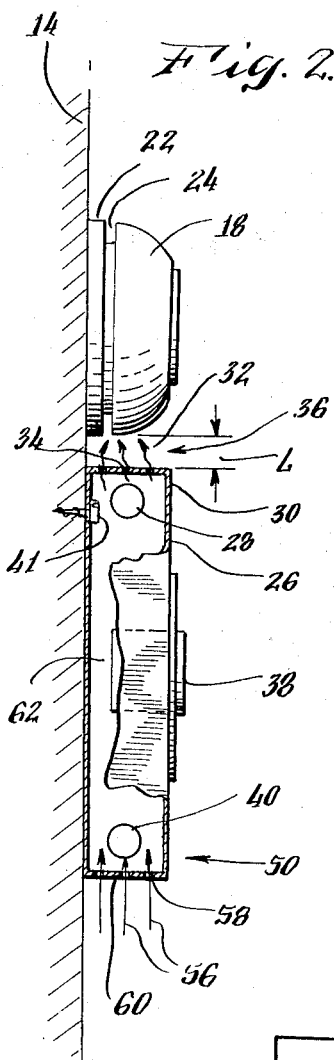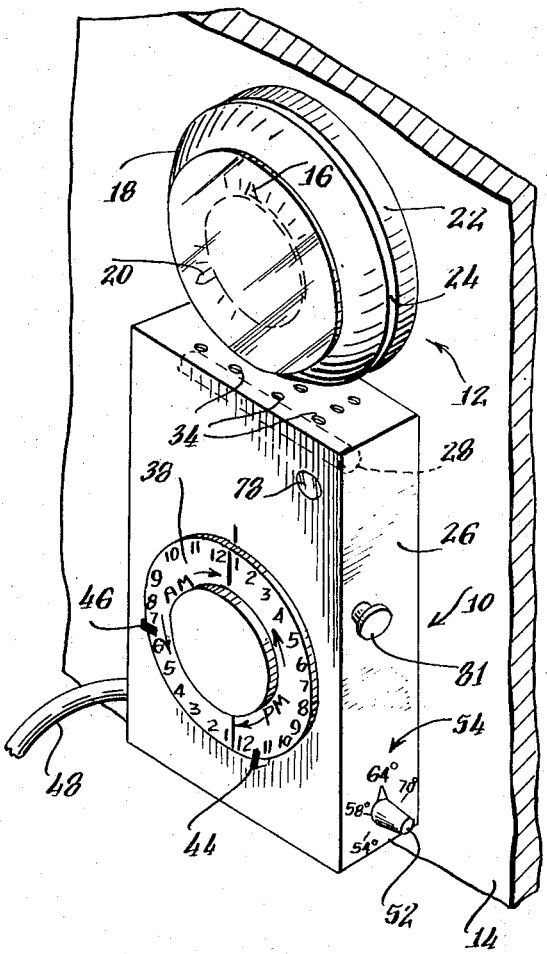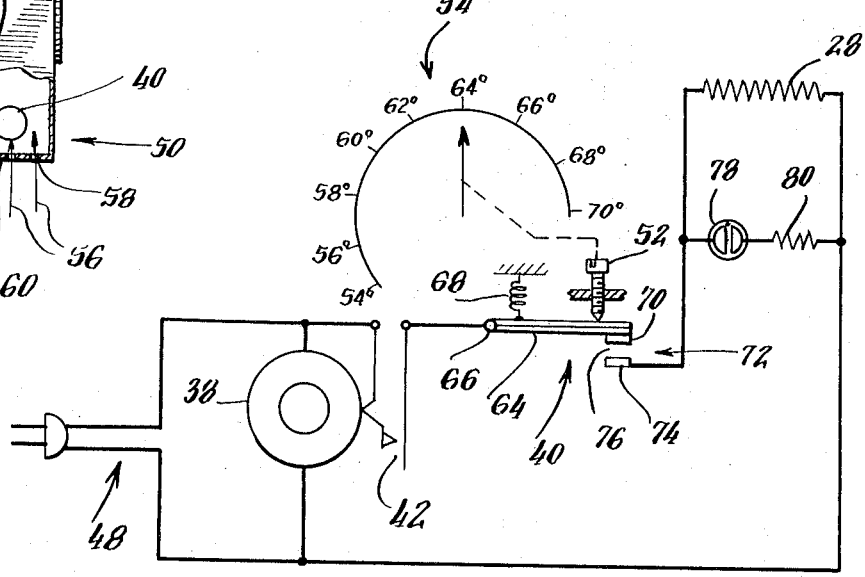
Fig. 1.
Fig. 2.
Fig. 3.

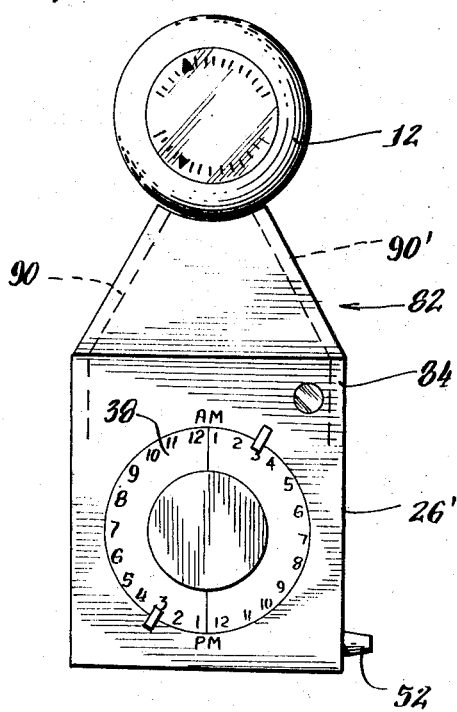
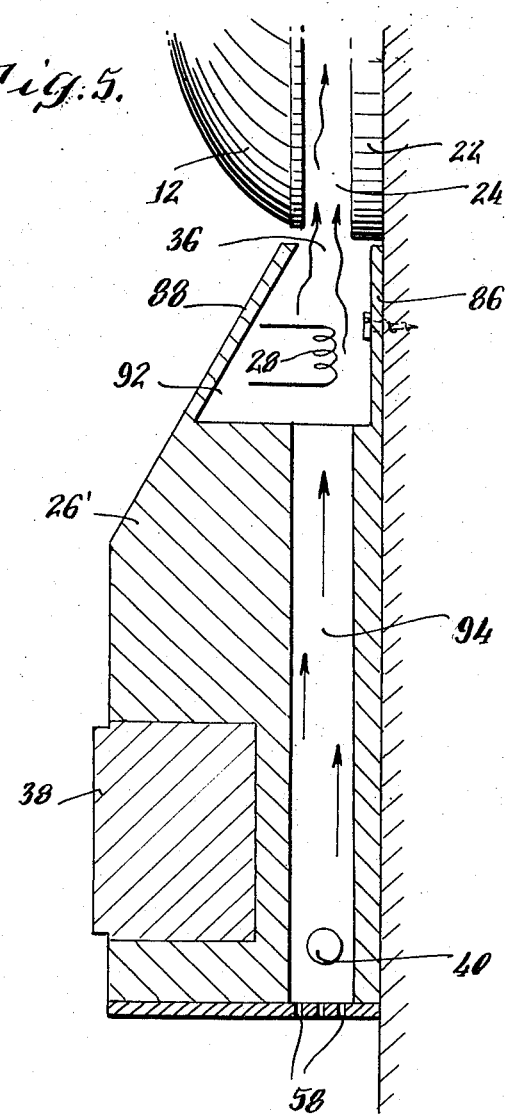

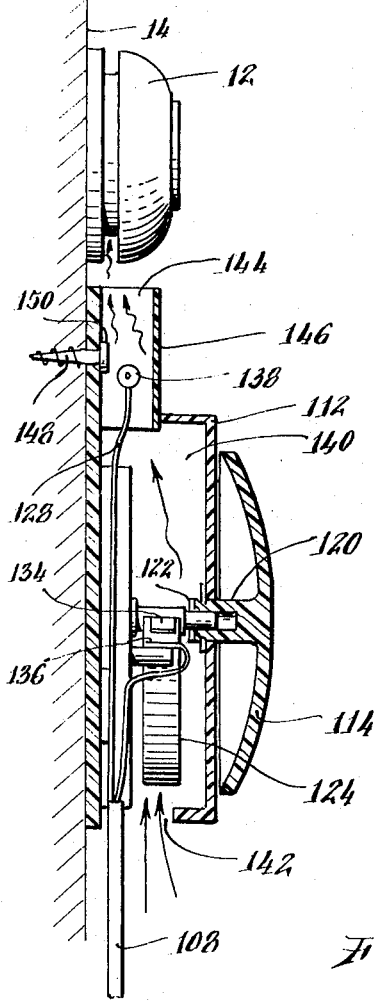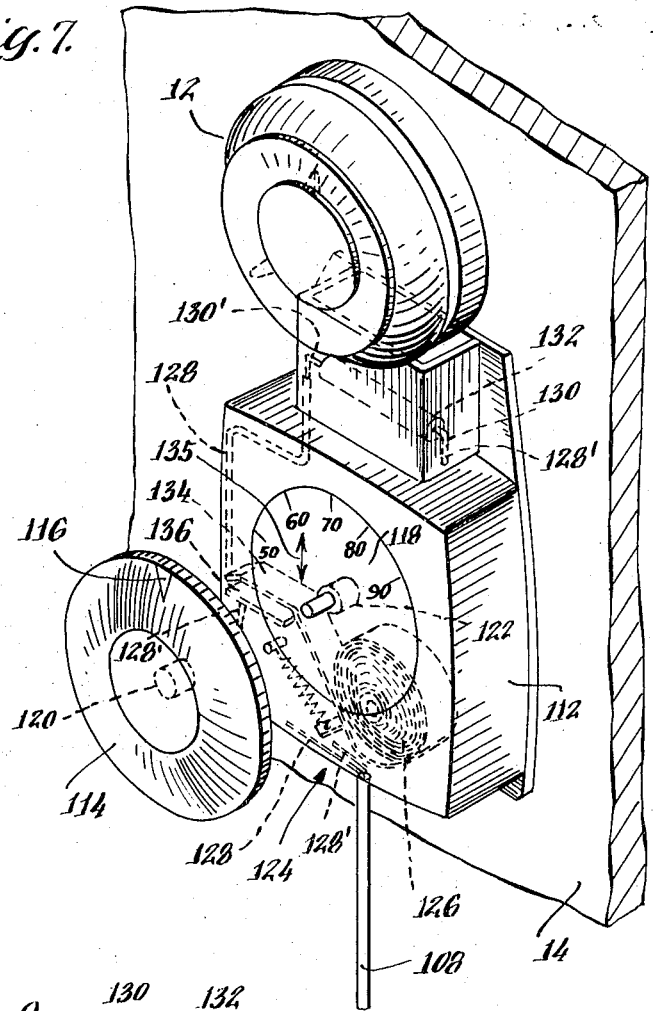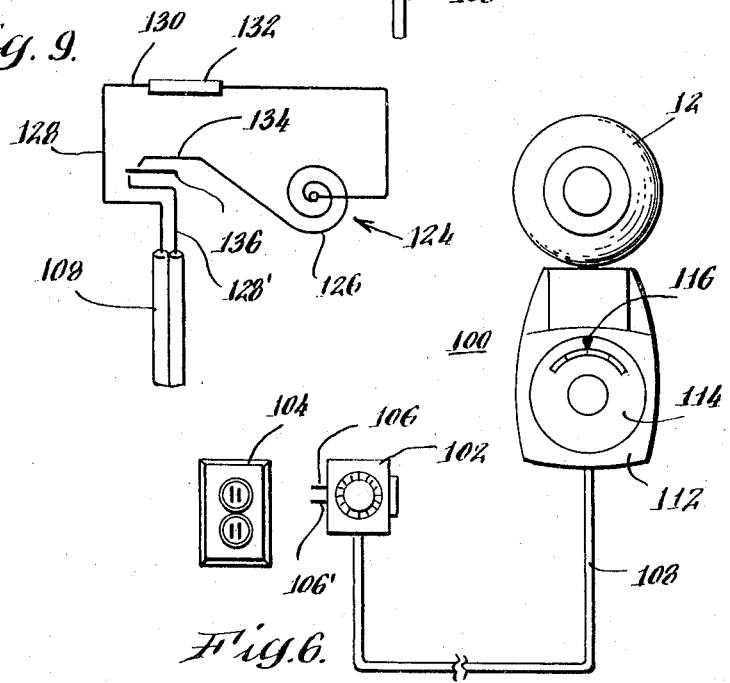

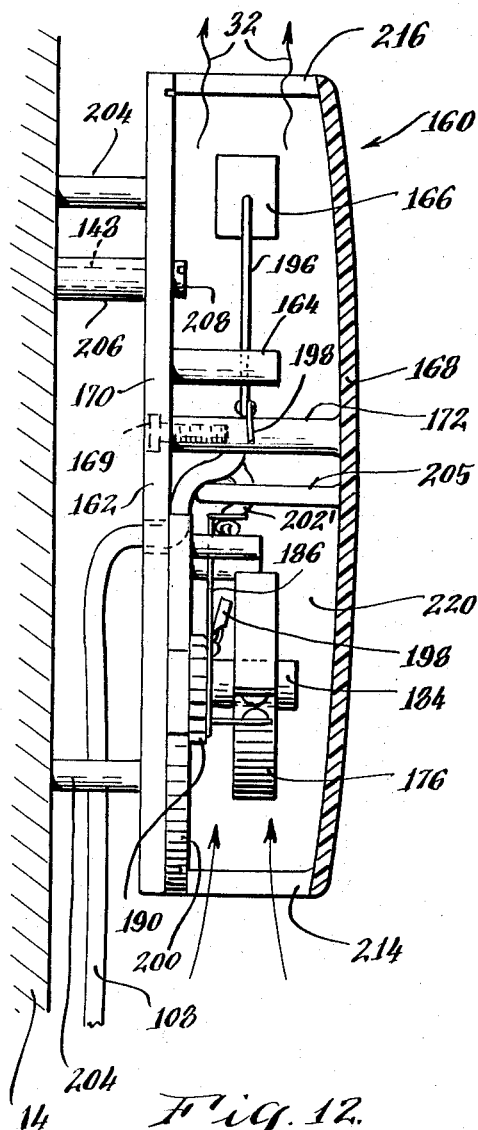
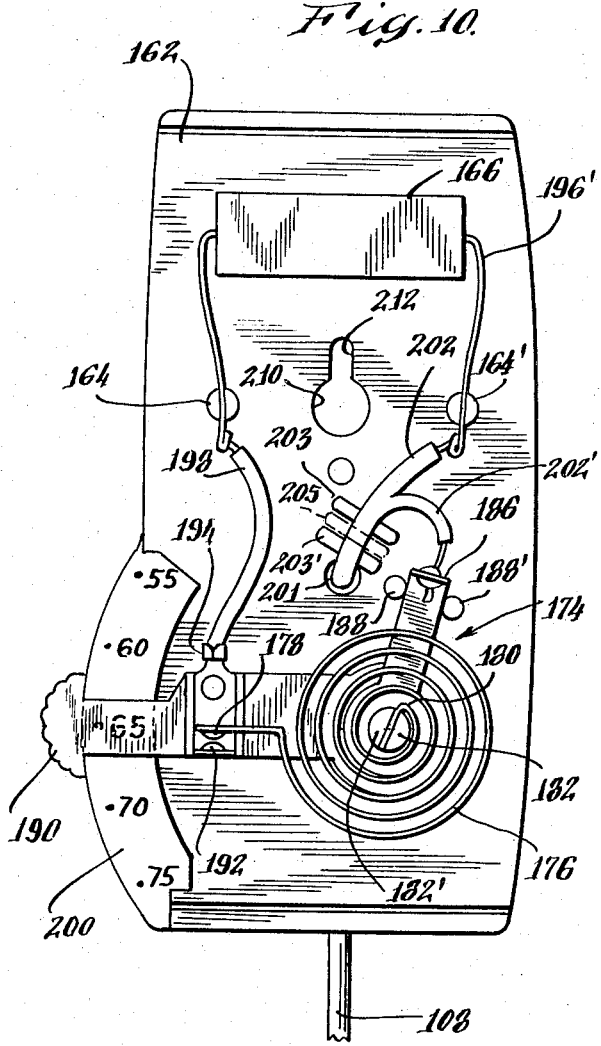
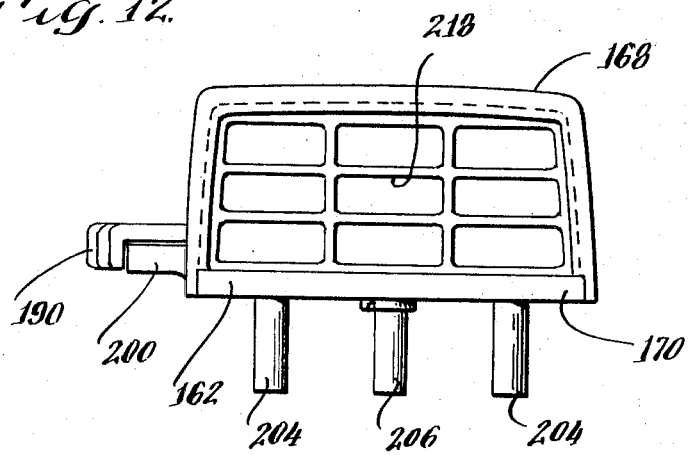

3,834,618

TEMPERATURE SETBACK CONTROL

This is a continuation-in-part of my patent application Ser. No. 385,857, filed Aug. 6, 1973, now abandoned and entitled A TEMPERATURE SETBACK CONTROL.

FIELD OF THE INVENTION

This invention relates to a self contained apparatus for automatically setting back the temperature of a room controlled by a conventional heating system during selectable time periods.

BACKGROUND OF THE INVENTION

Conventionally one may manually set a thermostat back to a lower night time temperature for comfort or fuel economy. This manual setback method has a disadvantage in that the temperature in the morning is too cold for comfort. Devices for automatically varying the temperature of a room during night time hours have been widely employed and described in the art and provide the comfort of a warm-up before arising. Typically, a timer is employed to determine when a temperature setback condition is to become effective. An early U.S. Pat. No. describing a timer in use with a thermostat controlled heating system is the patent to Otis 1,207,618. A night and daytime temperature regulating system is described in the U.S. Pat. Nos. to Dicke 1,876,636 and 1,931,464. The U.S. Pat. No. 1,876,636 describes a heat source which simulates a change in temperature of a room by applying heat to a thermostat. The heat source thus causes the thermostat to register a higher room temperature than actually exists and thus inhibits the heating system operative in the room from being energized as long as the heat source is on. In response to this simulation, the thermostat de-energizes the heating system operative in the room to obtain, for example, a cooler night time room temperature with a corresponding saving in fuel. The system described in the Dicke patents requires substantial wiring to install with electrical connections to the heating system to bring the clock operated temperature setback mechanism into operation. Such structural changes may be convenient to install during the building of a house but require extensive work to install with existing heating systems.

In the German patent publication Auslegeschrift 1,248,261 applied for in 1964 and laid open for inspection Aug. 24, 1967, a glow lamp is employed adjacent a temperature sensor to simulate a higher temperature when a timer enables electrical power to be applied to the glow lamp. Energization of the glow lamp provides a high temperature simulation, which causes closure of a heating fluid control valve connected in series with a radiator. The timer controlled heating system described in the German patent prevents any heat from reaching the radiator during the time the timer energizes the glow lamp. Thus the room temperature slowly descends to whichever external temperature may exist until the timer disables the glow lamp to enable resumption of the heating system.

Other recent patents relating to temperature setback devices are the U.S. Pat. Nos. to O'Connor 3,386,496 and to Schuller 3,525,222. In the Schuller patent a temperature regulator for an electric refrigerator is described wherein a heat source simulates a requirement for refrigeration in excess of what is actually necessary in order to maintain the refrigerator temperature sufficiently below the dew point. U.S. Pat. No. to Hewitt, Jr. et al. 3,251,549 relates to an illuminated thermostat for use with a domestic heat control system.

A significant disadvantage and inconvenience in temperature setback devices described in these various patents involves the extensive structural changes needed to install a temperature setback device in existing domestic heating systems. The installation commonly requires the addition of wires which are routed inside walls and floors to connect to furnace controls. These modifications tend to increase the cost of a night time temperature setback device with an expensive charge for installation. As a result, the extensive use of temperature setback devices has been less attractive to the home owner. Yet a widespread use of night time temperature set back devices would be of significant advantage in any age where energy conservation is beneficial to the public and is a publicly recognized and supported policy.

SUMMARY OF THE INVENTION

In a temperature setback control in accordance with the invention, automatic temperature setback is provided in a convenient manner with existing heating systems without requiring any wire modifications or domestic structural changes.

A temperature setback control in accordance with the invention is mounted adjacent a conventional heating system thermostat such as employed in homes, apartments, offices, public accommodations and the like. A direct physical contact with the thermostat is not required.

As described with reference to a preferred embodiment in accordance with the invention, a setback housing enclosing a heat source is located to generate a convection flow of heated air towards the adjacently located conventional room thermostat. An adjustable timer is located in the setback housing to energize the heat source during a desired time period while an ambient temperature sensor is located in the setback housing to control actuation of the heat source and maintain the room at a desired setback temperature during the time period selected by the timer. In another embodiment the timer is separated from the setback housing.

The temperature setback control in accordance with the invention is self contained within a housing to form a small device located in an unobtrusive manner at a slight distance from the conventional room thermostat. The spacing distance between the setback control and the room thermostat is selected sufficiently small to enable the setback control to influence the operation of the room thermostat during the desired setback time as determined by the timer. The spacing is further selected sufficiently great to enable the room thermostat to operate in its conventional normal manner to control room temperature when temperature setback is not desired.

A temperature setback control in accordance with the invention relies upon a convection flow of air to a conventional thermostat to simulate a higher room temperature than actually exists. When the thermostat responds to the convection flow by shutting off the heating system, the room temperature is permitted to drop to a setback level determined with a variable thermal element on the setback housing. When the setback level has been reached, the heat source is deenergized and the thermostat again permitted to resume normal control of the heating system.

The temperature setback control in accordance with the invention is of an economic structure including a housing, a timer, a heat source and a variable temperature sensing switch element to effectively sense the setback temperature in the room and deactivate power to the heat source for a closed loop control of room temperature to the setback level.

The temperature setback control in accordance with the invention further is convenient to install. It merely needs mounting near the conventional room thermostat for its influence by the heat convection flow. Extra hard wiring to furnace controls and the opening of walls as required by prior art devices are eliminated.

Electric power for operation of the temperature setback control may be obtained from any nearby power socket.

In view of the small amount of electrical power needed, a supply of low voltage may be conveniently used to drive the control through a step-down transformer located at the power outlet. This permits smaller conductors to run along the wall and then may be cosmetically concealed.

The economic nature of the temperature setback control and its convenience of installation combine to enable a widespread utilization, thus providing a general reduction in home fuel or home electricity consumption. Many residences, whether they are homes or apartments have several thermostats, each often individually controlling a separate zone in the heating system. A setback control according to this invention is conveniently adopted for use with such multiple thermostat heating systems, resulting in both enhanced comfort and greater fuel economy.

The temperature setback control of this invention may be used in connection with a great variety of different thermostat styles and types and is independent of the electrical power system employed to operate the heating systems. Thus, whether the heating control system uses a high voltage or low voltage supply or fluid expansion devices makes no difference since the setback control of this invention can still be used.

With a self contained temperature setback control in accordance with the invention, it may easily be removed for installation with other thermostats in either different rooms of the residence or in other residences as may appear desirable.

It is, therefore, an object of the invention to provide a self contained temperature setback control which is convenient to install and of economic design. It is a further object of the invention to provide a practical and convenient self contained temperature setback control to achieve greater fuel economy and enable general fuel economy upon its adoption in many residences throughout the nation.

BRIEF DESCRIPTION OF DRAWINGS

These and other advantages and objects of the invention will be understood from the following description of several embodiments for a self contained temperature setback control in accordance with the invention described in conjunction with the drawings wherein FIG. 1 is a perspective view of a self contained temperature setback control in accordance with the invention placed in operative relationship with a conventional room thermostat;

FIG. 2 is a side view in partial section of the self contained temperature setback control in accordance with the invention as illustrated in FIG. 1;

FIG. 3 is a schematic illustration of a self contained temperature setback control such as used in the embodiment of FIG. 1;

FIG. 4 is a front view in elevation of another embodiment for a self contained temperature setback control in accordance with the invention;

FIG. 5 is an enlarged side partial section view of the self contained temperature setback control shown in FIG. 4;

FIG. 6 is a front view of still another embodiment for a setback control in accordance with the invention;

FIG. 7 is a perspective partially exploded view of a setback control shown in FIG. 6;

FIG. 8 is a side view in partial section of the wall mounted setback control shown in FIG. 7;

FIG. 9 is a schematic representation of the electrical circuit used in the setback control of FIG. 6;

FIG. 10 is a front view of a temperature setback housing assembly in accordance with the invention with the front cover removed;

FIG. 11 is a side section view of the temperature setback device as shown in FIG. 10 with the front cover attached; and FIG. 12 is a bottom view of the temperature setback device shown in FIG. 11.

DETAILED DESCRIPTION OF EMBODIMENTS

With reference to FIGS. 1 and 2, a self contained temperature setback control device 10 is shown in operative position with a conventional room thermostat 12 mounted at a suitable height on a common wall 14 of a room. The conventional thermostat 12 controls a heating system (not shown) to maintain the room at a thermostat selected temperature. Typically, thermostat 12 will have a desired temperature setting indicator 16 operated by a rotating disc 18 and an actual room temperature sensor indicator 20. Disc 18 on which the thermostat temperature sensor generally indicated at 20 is located is spaced from a wall support 22 a circular opening 24 to enable room convection air flow to freely pass alongside the sensor 20 and expose the latter to actual ambient room temperature. The spacing 24 may vary with different room thermostats. Since conventional thermostats generally provide apertures to enable air flows occurring along a wall to register actual room temperatures, the specific thermostat 12 shown in FIG. 1 is merely exemplary.

The self contained temperature setback control 10 includes a housing 26 which is provided with a heat source 28 located at the top end 30 of housing 26 and from which heated air, suggested by arrows 32, may be applied through apertures 34 defining a heated air exit 36. Housing 26 further includes a timer 38 and a variable setback temperature sensing switch element 40. Housing 26 is mounted to wall 14 with a suitable screw 41 extending through an aperture in the back of housing 26 to engage a slot for positive retention at a desired influencing distance from thermostat 12. The distance L between thermostat 12 and housing 26 may vary depending upon the heat generated by heat source 28, the amount of disturbing convection flows that may be present along wall 14 and the type of thermostat employed. Generally, with a low power element of from about one to five watt heat source 28, a distance L of from one to several inches is sufficient. In other embodiments such as shown in FIGS. 4 and 5 the distance L may be reduced to a minimum and in some instances it may even be desirable to direct a small tube from housing 26 into space 24 and onto sensor 20 to enable a very small heater 28 to produce sufficient heated air convection flow through the tube to influence thermostat 12.

Timer 28 may be a conventional twenty-four hour electric clock timer which controls a timer switch such as 42 (see FIG. 3) which is opened or closed in correspondence with the settings of on and off trips 44, 46 respectively. Switch 42 is closed by trip 44 and opened by trip 46. The placements of trips 44, 46 are manually selectable to provide a desired operating time period when the temperature setback controller is to be operative. The timer is driven from ordinary line power supplied through a line cord 48 whose other end may be plugged into a conventional room power socket. Although a pair of trips 44, 46 are shown, additional trips may be added if the need for additional temperature setback periods arise. Timers are well-known in the art and further description for this invention is not necessary.

At the bottom end 50 of housing 26 is setback temperature regulator element 40 which senses the actual ambient room temperature and operates at a selectable temperature to close a switch. Element 40 is variable by rotating knob 52 having a pointer aligned with a temperature scale 54 on the housing 26. The scale 54 includes setback temperature indicia varying from as low as 54° to 70°. Other ranges may be accommodated as desired. The element 40 is located to enable upward air convection flows as suggested by arrows 56 to pass through apertures 58 in the bottom 60 of housing 26 towards the heat source 28.

As shown in the view of FIG. 2, housing 26 provides a passage 62 extending between apertures 58 and 34. Passage 62 provides a convenient air convection flow path so that heated air generated by heat source 28 may initiate an uninterrupted flow of air along passage 62. Since cooler ambient air enters through the bottom apertures 58, the element 40 is continually exposed to the ambient room temperature. In this manner, the desired setback temperature level of the room may be quickly and accurately sensed during setback operation.

As shown in FIG. 3, the setback temperature regulator element 40 is formed of a bimetal structure 64 pivotally mounted at 66 and spring loaded against control knob 52 by a spring element 68. A contact 70 is located at the other end of bimetal 64 to form a regulator switch 72 with a stationary contact 74. Rotation of knob 52 controls the spacing 76 between contacts 70, 74 and thus the temperature at which switch closure occurs. This described operation for the setback temperature regulator is illustrative of the various types of temperature sensing and switch controlling devices that may be used. The current flow through bimetal element 64 to drive heat source 28 is generally small enough to avoid influencing the temperature sensing accuracy of the bimetal. A different temperature sensor and element 40 may be used where the temperature sensing element 64 is preferably not directly connected into the circuit.

In the operation of the setback temperature control 10, assume that the timer 38 under power supplied by cable 48 encounters the "on" trip 44. This closes timer switch 42 and allows power to be delivered to heat source 28 when switch 72 has closed. Assuming that the ambient temperature is 70° and the selected setback temperature is 64°, then switch 62 has, in fact, closed and power is delivered to heat source 28.

Heat source 28 may be a very low power consuming device such as a two watt producing resistor or a low power incandescent lamp. The voltage applied to heat source 28 is line voltage and the resistance of heat source is then approximately 6,000 ohms. As heat is applied, heated air emerges through apertures 34 towards the temperature sensor in thermostat 12. The latter responds by shutting off the heating system and thus allows the room temperature to drop towards the desired setback level of 64°.

When the room temperature drops to the setback level of 64°, the bimetal element 64 exposed to the ambient air flow entering apertures 58 commences to open up switch 72 and when this has opened, power to heat source 28 has been removed. At this point, the heating system may be reenergized when the effect of heat source 28 has been removed and the room temperature permitted to rise again to a level where the setback regulator 40 again closes switch 72. In this manner closed loop control of the room temperature to the setback level may be maintained without electrical connection with the thermostat 12 and its associated electrical newtork. This closed loop control to the setback level continues until timer 38 engages the "off" trip 46 to open switch 42 and return normal control of the room temperature to thermostat 12.

A neon lamp 78 and current limiting resistor 80 are connected in parallel with heat source 28 to indicate whether temperature setback control 10 is operating when timer 38 is in its night setback period. The timer preferably includes a manual lock out 81, such as provided in a timer made by the International Register Company, with which lock out the action from trippers 44, 46 may be suspended. Such suspension does not interrupt the clock, but inhibits the temperature setback when a party or activity proceeds past the usual bedtime or setback time.

FIGS. 4 and 5 illustrate an alternate embodiment for a temperature setback control in accordance with the invention wherein a self-spacing baffle 82 is provided at an upper end 84 of a housing 26' to assure that a heat source 28 produces heated air-flow passes through or influences thermostat 12. Baffle 82 is formed with a wall located segment 86 and an outer wall segment 88 and with side segments 90–90' inclined towards each other in order to form a protected region 92. Region 92 enables a convection flow of heated air to pass in an uninterrupted manner. The baffle 82 further serves as a spacer with which an operable distance between the thermostat 12 and temperature setback control 10 can be conveniently established.

Housing 26' is further provided with a passage 94 to enable air from a lower end to flow upwardly along passage 94 and region 92 towards thermostat 12. A heater, such as 28, is located in region 92 to heat the air and provide the desired temperature setback. The baffle is shaped by the inclined side segments 90–90' to enable normal functioning of the thermostat 12 when the control 10 is inactive.

FIGS. 6 through 8 show a temperature setback device 100 wherein a conventional timer 102 is mounted directly on a conventional wall socket 104 with plug contacts 106–106'. A low electrical power carrying cable 108 is then used to supply electrical power to setback control 110. Removal of timer 102 from the set ack housing eliminates any thermal influence the timer can exert upon the setback operation due to the heat generated within the timer motor. Setback control 110 has a setback housing 112 which includes a setback temperature selector in the form of a transparent disc 114 whose scale pointer 115 can be rotated over a setback housing temperature scale 118. The setback temperature selector 114 has a hub 120 sized and shaped to frictionally or otherwise positively engage a rotatably mounted lever 122. Lever 122 in turn is connected to a thermostat element 124 whose spiral 126 is coupled in series with a heater 132 (see FIG. 9). Lever 122 is coupled to thermostat spiral 126 to vary its tension with a spring 133 and thus the vertical position of a cantilever extension 134 thereof as shown by double ended arrow 135.

As shown in FIG. 9, the movable contact arm 134 forms a temperature controlled switch with a stationary contact 136. One conductor lead 128 from input power line 108 is directly coupled to terminal 130 of heater 132 while the other conductor 128' is shown connected to stationary contact 136. A wire 138 couples the center of spiral 126 to the other terminal 130' of resistor heater 132.

The spiral 126 provides the force for the movement of contact arm 134 to and from contact 136 in the direction of arrow 135 in response to temperature variations. The temperature at which contact of the switch is broken is determined with the rotation of lever 122 by setback temperature selector disc 114. The selection and formation of the setback temperature thermostat 124 may be from conventionally available components having sufficient accuracy and convenience for use in setback housing 112.

The setback housing 112 is provided with an air flow passage 140 extending from a lower entry port 142 to an upper exit port 144. An upper channel segment 146 is provided to extend the air passage 140 and funnel heated air from heater 132 towards the room thermostat 12. The heater 132 is mounted in the channel 146 to influence the air flow through air passage 140. A conventional mounting screw 148 is provided to support setback housing 112 against wall 14. The head 150 of screw 140 fits through a suitable aperture in the wall mounting side of housing 12.

The location of the setback thermostat is shown in passage 140. However, other suitable locations may be selected, provided the setback thermostat may effectively regulate the production of an ambient room temperature controlling convection flow to establish a setback temperature in the room.

With reference to FIGS. 10, 11 and 12, another temperature setback housing 160 is shown. The housing includes a generally flat mounting plate 162 of insulative plastic and provided with a pair of heater mounting studs 164–164' on which a heater element 166 of several watt capacity is mounted. Housing 160 is provided with a plastic cover 168 which may be attached to mounting plate 162 with a screw 169 extending from the back 170 of plate 162 into a post 172 part of housing cover 168.

The mounting plate 162 further has a conductive thermostat mount 174 which retains a setback thermostat 176. Thermostat 176 is of the spiral type having a switch contact 178 at one movable end and a stationary electric terminal end 180. The stationary end 180 is captured between the split ends 182–182' of a metal post 184 crimped to a metal extension bracket 186. The bracket 186 is captured between a pair of plastic posts 188–188' to prevent rotation of the stationary end 180 of thermostat 176.

The thermostat mount 174 is mounted to plate 162 with a bottom extension (not shown) of metal post 184 which extension is frictionally press fitted in an undersized recess (not shown) in plate 162. Since post 184 is electrically connected to the power line 108, the recess in which post 184 is mounted is closed off from the back 170 of plate 162.

A plastic temperature selector 190 is pivotally mounted around post 184 and is provided with a switch contact 192 for movement towards or away from thermostat contact 178 to establish switch closure at a desired setback temperature. Switch contact 192 is riveted to selector 190 and carries electric lead contacting means 194 to enable electrical coupling between switch contact 192 and a lead 196 of heater element 166 with lead 198. Lead 198 (being shown in partial form in the view of FIG. 11) is flexible to enable pivot movement of the temperature selector 190 over the setback temperature range from 55° to 75° Fahrenheit as indicated on the arcuate scale 200 on plate 162. The frictional fit of selector 190 to plate 162 is sufficient to maintain the desired temperature selecting position.

Electrical power is delivered over a cable 108 which is fed through an aperture 201 over a pair of spaced molded ridges 203–203' for connection to components. A cable clamp 205 molded into cover 168 extends down to and between ridges 203 to clamp cable 108 to the plate 162. One lead 202 of cable 108 is shown connected to the other lead 196' of heater element 166. The other power lead 202' is connected to the captured bracket extension 186.

Plate 162 is provided with four stand-off posts 204 sized to enable heated air from heater element 166 to influence a room thermostat below which the set-back housing 160 may be mounted. The housing 160 may be mounted to wall 14 with a screw 148 and spacer 206 with the head 208 of the screw being sufficiently small to fit through the enlarged segment 210 of a keyhole 212 in plate 162. Alternatively, suitable adhesives may be employed to retain housing 160 on wall 14.

Cover 168 is shaped to provide end located air entrance port 214 and a heated air exit port 216. Cover 168 preferably includes suitable gratings or grills 218 over both ports 214, 216 to prevent inadvertent entry of large metal objects and safeguard against electrical hazards. The cover 168 and plate 162 form an air passage 220 to enhance vertical air convection flow.

The thermostat 176 is shown formed of a spiral type, though other types may be employed such as those which provide a snap action for improved electrical connection between contacts 178 and 192.

The spacing between the heater element 166 and the thermostat 176 is selected sufficiently great to significantly reduce thermal influence from the heater 166 on the thermostat. Such thermal influence tends to be reduced by the convection air flow through passage 220.

Operation of the temperature setback devices 100 and 160 is essentially the same as previously described with reference to the other figures. The operation in particularly free from thermal disturbances emanating from a heating timing motor in timer 102 which is located at a remote wall socket. The setback housings 112 and 160 are convenient to mount, economic to manufacture and easy to install. The timer 102 may be a conventionally available device which need not be modified for use with setback control 110. The cable 108 may plug into a socket (not shown) located on timer 102 having variable settings to determine the times when power is supplied to setback control 110. The power to be supplied to heater 132 is small, being measured in the order of several watts.

Having thus described a temperature setback control in accordance with the invention, its advantages may be appreciated. A temperature setback over a selectable time period is made possible without requiring technically complex interconnections with the wiring of a heating system. The mounting of the setback housing is a convenient, easily employed task, convenient to those who may be less technically inclined, but who are aware and concerned about the conservation of fuel that the temperature setback control of this invention can provide.

The benefits obtained with a temperature setback control in accordance with the invention include all those obtainable from conventional devices such as greater sleeping comfort with reduced room temperatures, and automatic operation without personal attention to activate or deactivate the device.

In addition, the temperature setback control of this invention provides the advantages of ease of installation as well as removal for use in other rooms or houses. Another advantage resides in low cost to enable a wide-spread utilization for a general fuel saving of significant public benefit.

What I claim is:

1. A temperature setback control for a temperature controlling system wherein a thermostat having a room temperature sensing element is employed on a wall in a room to sense room temperature for control of a heating system operative in the room to maintain a thermostat selected ambient room temperature comprising a self-contained room temperature simulator for setting back the room temperature controlled by the thermostat during a desired time period, said simulator being mounted in heated air convection flow relationship with the thermostat;

said room temperature simulator further including heating means for producing a convection flow of heated air and being located to expose the thermostat thereto;

timing means for enabling energization of the heated air convection flow producing means during a selected time period; and control means coupled to the heating means and the timing means and being operative above a predetermined ambient setback room temperature selected lower than the thermostat selected ambient room temperature for energizing the heating means to produce a convection flow of heated air to the thermostat for influencing its operation until the ambient room temperature has dropped to the predetermined temperature and effectively de-energizing said heating means when the ambient room temperature drops below the predetermined room temperature, whereby the ambient room temperature is maintained at the predetermined lower room temperature during the desired time period without electrical coupling to the room thermostat.

2. The temperature setback control as claimed in claim 1 wherein the simulator further includes a housing for retaining the self-contained room temperature simulator and being shaped to mount against the wall on which the thermostat is located, said housing being vertically aligned with the thermostat to enable generally vertical convection air flow from said heated air flow producing means to the thermostat for setback temperature control.

3. The improvement as claimed in claim 2 wherein the housing includes baffle means located to extend upwardly towards the thermostat upon operative mounting of the housing on the wall for protection of a region including the generally vertical convection air flow from the heating means for accurate setback ambient room temperature control.

4. A temperature setback control for a temperature controlling thermostat having a room temperature sensing element employed on a wall in a room to sense room temperature for control of a heating system operative in the room to maintain a thermostat selected ambient room temperature comprising a self contained setback control housing shaped for mounting below the thermostat on the wall of the room at a distance selected to enable heated air from the housing to infuence the operation of the thermostat, the housing being provided with a heated air exit located to enable escape of heated air therefrom to pass onto the thermostat;

an electrical heat source located in the housing to generate a flow of heated air from said air exit;

timing means mounted to the housing for enabling electrical energization of the heat source during a selected time period;

a room temperature sensor located in the housing;

switch means effectively controlled by the room temperature sensor and coupled between the room temperature sensor and the heating means for enabling electrical energization of the heating means; and means for selecting a predetermined reference temperature representative of a setback temperature above which said switch means is actuated to electrically energize the heating means and below which the heating means is de-energized, whereby said self-contained housing provides closed-loop control of the heating system to a setback temperature level without physical connection thereto.

5. The temperature setback control as claimed in claim 4 wherein the spacing between the heated air exit and the thermostat is selected sufficiently small to enable influencing of the thermostat and sufficiently great to enable normal thermostat control of the heating system when the setback control is inactive.

6. The temperature setback control as claimed in claim 5 wherein the housing is further provided with an air-flow passage oriented to enable vertical air convection flow, with said room temperature sensor located near a lower end of the passage to enhance ambient room temperature sensing and with the electrical heat source located above the room temperature sensor to enhance the air convection flow through said passage.

7. The temperature setback control as claimed in claim 6 and further including a baffle extending from the housing towards the thermostat, said baffle being shaped to form an air flow protected region to enhance influence of the thermostat by the flow of heated air from the heat source in the self-contained setback control housing.

8. The temperature setback control as claimed in claim 4 wherein the timing means includes a timer and a timer controlled switch, with the electrical heat source coupled to the timer switch for energization when the timer switch is closed, said switch means being coupled in electrical series relationship with the timer switch and heat source to enable operation of the setback control without electrical connection to the heating system operative in the room.

9. The temperature setback control as claimed in claim 8 wherein the heat source is of low voltage range.

10. The temperature setback control as claimed in claim 9 wherein the room temperature sensor in the housing is of the bimetal type mounted in electrical series relationship with the low power heat source whose current demand is sufficiently low to avoid disturbance of operation of the bimetal housing mounted room temperature sensor.

11. In a temperature setback control using a timer to establish a temperature setback for a control system coupled to a heating system operative in a room with a room thermostat located on a wall in the room to maintain a thermostat selected room temperature, the improvement comprising
a setback housing adapted for mounting below and near the room thermostat and having an air passage oriented to influence the operation of the room thermostat without electrical coupling thereto with a heated air convection flow emerging from an upper port in the air passage;
a heater element mounted to the setback housing to provide the convection flow of air from the upper port, and a temperature selectable setback thermostat mounted in the setback housing, said setback thermostat being coupled in electrical circuit with the heater element to maintain the room at a setback thermostat selected temperature by enabling the electrical energization of the heater element to influence the room thermostat when the ambient room temperature is above the selected setback temperature and inhibit electrical energization of the heater element to enable normal room thermostat operation when the ambient room temperature falls below the selected setback temperature.

12. The improved temperature setback control as claimed in claim 11 wherein the setback housing has an air passage extending in a generally vertical orientation when the setback housing is operatively mounted with a room thermostat, said air passage extending from a lower air entrance to the upper exit port with the heater element operatively coupled to the air passage towards the upper end thereof to effectively initiate the convection flow of heated air from the air passage.

13. The improved temperature setback control as claimed in claim 12 wherein the setback thermostat is effectively mounted to respond to air flowing through the passage from the lower air entrance with the temperature of the air entering the air passage at its lower air entrance being sufficient to influence the room thermostat and the setback thermostat.

14. The improved temperature setback control as claimed in claim 11 and further including
a timer device for coupling electrical power to the heater element controllably through the setback thermostat during a selectable time period, said timer device being separated from the setback housing to avoid timer generated thermal influence of the setback control.

15. A temperature setback control using a timer to establish a temperature setback for a heating system control operative in a room with a room thermostat located in a wall in the room to sense ambient room temperature for heating system control to establish a room thermostat selected temperature comprising
a setback housing for mounting in air convection flow communication with the room thermostat and having an air passage extending from a lower air entrance to an upper air exit port to facilitate the generation of air convection flow from the air exit port to the room thermostat for operational influence thereof;
a low power heater element effectively mounted within the air passage to initiate a convection flow of heated air from the air exit port, with the heater element being sized in electrical power to produce a gentle convection flow of air flow sufficient to influence the operation of the room thermostat when the setback housing is operatively mounted with a room thermostat, the electrical power of the heater element being further selected sufficiently small to avoid undesirable heating of the setback housing;

a setback thermostat being located in the setback housing effectively to regulate the setback temperature controlling convection flow from the lower power heater element, the setback thermostat being temperature variable and coupled in interruptable electrical circuit with the heater element to enable heating of the heater element when the ambient room temperature is above a setback thermostat selected temperature to produce said heated air convection flow from the setback housing to influence the room thermostat and effectively disengage the heating system, with the setback thermostat disabling heating of the heater element when the ambient room temperature drops below the setback thermostat selected temperature to terminate said setback influencing of the room thermostat and enable its normal operation of the heating system.

16. The setback control as claimed in claim 15 wherein the setback housing is formed to provide an air passage channel for generally vertical mounting to produce upward projection of said heated air convection flow towards the room thermostat, with the heater element being chosen to enable spaced mounting of the setback housing from the room thermostat to enable influence thereof as well as enable normal operation of the room thermostat.

17. The setback control as claimed in claim 15 and further including a separable timer mountable to provide electrical power to the setback thermostat and the low power heater element during a timer-selectable duration.

* * * * *